(12) United States Patent
Lu et al.

(10) Patent No.: US 8,368,517 B2
(45) Date of Patent: Feb. 5, 2013

(54) RFID PRIVACY-PRESERVING AUTHENTICATION SYSTEM AND METHOD

(75) Inventors: Li Lu, Hong Kong (HK); Yunhao Liu, Hong Kong (HK); Jinsong Han, Hong Kong (HK)

(73) Assignee: Hong Kong R&D Centre for Logistics and Supply Chain Management Enabling Technologies Limited, Hksar (CN)

( * ) Notice: Subject to any disclaimer, the term of this patent is extended or adjusted under 35 U.S.C. 154(b) by 740 days.

(21) Appl. No.: 12/544,214

(22) Filed: Aug. 19, 2009

(65) Prior Publication Data
US 2010/0045442 A1 Feb. 25, 2010

Related U.S. Application Data

(60) Provisional application No. 61/136,257, filed on Aug. 22, 2008.

(51) Int. Cl.
*H04Q 5/22* (2006.01)
(52) U.S. Cl. .......... 340/10.3; 380/255; 340/572.1
(58) Field of Classification Search .......... 340/1.1, 340/10.1–10.6, 572.1–572.9; 235/375–385; 380/30, 44, 45, 277, 279; 713/161, 168, 713/175, 176; 726/1
See application file for complete search history.

(56) References Cited

U.S. PATENT DOCUMENTS

| | | | |
|---|---|---|---|
| 7,450,010 B1 * | 11/2008 | Gravelle et al. | 340/572.1 |
| 8,112,626 B1 * | 2/2012 | Adler et al. | 713/168 |
| 2004/0107341 A1* | 6/2004 | Hall et al. | 713/161 |

OTHER PUBLICATIONS

T. Kriplean et al., "Physical Access Control for Captured RFID Data", IEEE Pervasive Computing, vol. 6, No. 4, 2007.
L. M. Ni et al, "LANDMARC: Indoor Location Sensing Using Active RFID", Proceedings of the First IEEE International Conference on Pervasive Computing and Communications, 2003(PerCom 2003), p. 407-415.
Y. Li et al, "Protecting RFID Communications in Supply Chains", Proceedings of ASIACCS, Mar. 20-22, 2007.
P. Robinson et al, "Trust Context Spaces: an Infrastructure for Pervasive Security in Context-Aware Environments", Security in Pervasive Computing 2003, LNCS 2802, pp. 157-172, 2004.
S. Weis et al, "Security and Privacy Aspects of Low-Cost Radio Frequency Identification Systems" Security in Pervasive Computing 2003, LNCS 2802, pp. 201-212, 2004.
T. Dimitriou, "A Secure and Efficient RFID Protocol that Could make Big Brother (partially) Obsolete", Proceedings of the Fourth Annual IEEE International Conference on Pervasive Computing and Communications (PERCOM'06).
D. Molnar et al, "Privacy and Security in Library RFID: Issues, Practices, and Architectures" Proceedings of CCS, 2004.
D. Molnar et al, "A Scalable, Delegatable Pseudonym Protocol Enabling Ownership Transfer of RFID Tags", SAC 2005, LNCS 3897, pp. 276-290, 2006.

(Continued)

*Primary Examiner* — Brian Zimmerman
*Assistant Examiner* — James Yang
(74) *Attorney, Agent, or Firm* — Eagle IP Limited; Jacqueline C. Lui

(57) ABSTRACT

A system and method for RFID privacy-preserving authentication is disclosed. The method first has a reader sending a request and a first random number to a tag. The tag then generates a second random number. A plurality of hash values are then computed at the tag. Each hash value uses the first random number, the second random number and at least one part of a key of the tag as inputs. The second random number and the computed hash values are then sent to the reader. Lastly, the reader identifies a validity of the tag from the received values. The hash values are all generated in parallel and are independent to each other.

6 Claims, 12 Drawing Sheets

OTHER PUBLICATIONS

L. Lu et al, "Dynamic Key-Updating: Privacy Preserving Authentication for RFID Systems", Proceedings of the Fifth Annual IEEE International Conference on Pervasive Computing and Communications (PerCom'07).

G. Avoine et al, "Reducing Time Complexity in RFID Systems", SAC 2005, LNCS 3897, pp. 291-306, 2006.

S. C. Bono et al, "Security Analysis of a Cryptographically-Enabled RFID Device", Proceedings of USENIX Security, 2005.

M. C. O'Connor, "Taking Advantage of Memory-Rich Tags", RFID Journal, http://www.rfidjournal.com/magazine/article/2925.

A. Juels et al, "Defining Strong Privacy for RFID", Proceedings of the Fifth Annual IEEE International Conference on Pervasive Computing and Communications Workshops(PerComW'07).

A. Juels, "RFID Security and Privacy: a Research Survey", IEEE Journal on Selected Areas in Communications, vol. 24, pp. 381-394, 2006.

M. Ohkubo et al, "Efficient Hash-Chain based RFID Privacy Protection Scheme", International Conference on Ubiquitous Computing, Workshop Privacy, 2004.

A. Juels, "Minimalist Cryptography for Low-Cost RFID Tags", Proceedings of International Conference on Security in Communication Networks—SCN, vol. 3352 of LNCS, pp. 149-164, 2004.

T. Dimitriou, "A Lightweight RFID Protocol to Protect Against Traceability and Cloning Attacks", Proceedings of the First International Conference on Security and Privacy for Emerging Areas in Communications Networks (SECURECOMM'05).

G.Tsudik, "YA-TRAP: Yet Another Trivial RFID Authentication Protocol", Proceedings of the Fourth Annual IEEE International Conference on Pervasive Computing and Communications Workshops (PERCOMW'06).

G. Avoine et al, "A Scalable and Provably Secure Hash Based RFID Protocol", Proceedings of the 3rd Int'l Conf. on Pervasive Computing and Communications Workshops (PerCom 2005 Workshops).

M. E. Hellman, "A Cryptanalytic Time-Memory Trade-off", IEEE Transactions on Information Theory, vol. IT-26, pp. 401-406, No. 4, Jul. 1980.

"Expands Tag-it ISO/IEC 15693 RFID Product Line", News Releases from Texas Instruments, http://www.ti.com/rfid/shtml/news-releases-rel12-14-05.shtml.

G. Avoine, "Adversarial Model for Radio Frequency Identification", Cryptology ePrint Archive, Report 2005/049, 2005.

M. Bellare et al, "Random Oracles are Practical: A Paradigm for Designing Efficient Protocols", 1st Conf.-Computer & Comm. Security '93-Nov. 1993-VA, USA.

W. Wang et al, "Storage-Awareness: RFID Private Authentication based on Sparse Tree", Third International Workshop on Security Privacy and Trust in Pervasive and Ubiquitous Computing (SecPerU 2007).

\* cited by examiner

Algorithm 1: TagJoin (Tag $T$, Key Tree $S$)

$k^p, k^l \leftarrow$ KeyGeneration($T$);
$(k^p[0], \ldots, k^p[d-1]) \leftarrow$ KeyDivision($k^p$);
Node $\leftarrow$ GetRoot($S$);
for $i = 0$ to $d$-1
    Add $k^p[i]$ into *Node*'s Index Set *IS*;
  if the $k^p[i]$-th child does not exist
    Create the $k^p[i]$-th child;
    *Node* $\leftarrow$ the $k^p[i]$-th child;
  else *Node* $\leftarrow$ the $k^p[i]$-th child;

Fig. 4

Reader $R$                  Tag $T_i$

Request, $r_1$ →

← $U$ $\sigma$ →

Fig. 6

Algorithm 2: Identification ($U$, node $X$)

SUCCEED ← *false*;
$m$ ← DepthOfNode($X$);
$IS$ ← GetIndexSet($X$);
$IN$ ← |$IS$|;
if $m \neq d$
    for $i = 1$ to $IN$
        if $v_m = h(r_1, r_2, i) \wedge i \in IS$
            $Y$ ← GetChild($X,i$);
            Identification ($U,Y$);
else if $m = d \wedge h(r_1, r_2, k_1) = v_d$
    SUCCEED ← *true*;
If (SUCCEED = *false*)
    Fail and output 0;
Accept and output 1;

Fig. 7

Sending a random number $r_1$ to the tag, receiving a message $U$ from the tag.

70

Computing $h(r_1,r_2,2)$, $h(r_1,r_2,3)$, and $h(r_1,r_2,4)$; Comparing them with $v_0$. Finding that the 2 is key used by the tag at the root level.

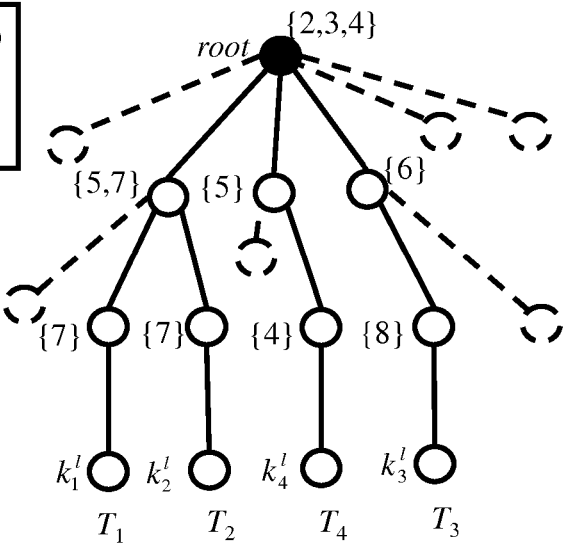

72

Computing $h(r_1,r_2,5)$ and $h(r_1,r_2,7)$; Comparing them with $v_1$; Finding that the 5 is key used by the tag at this level.

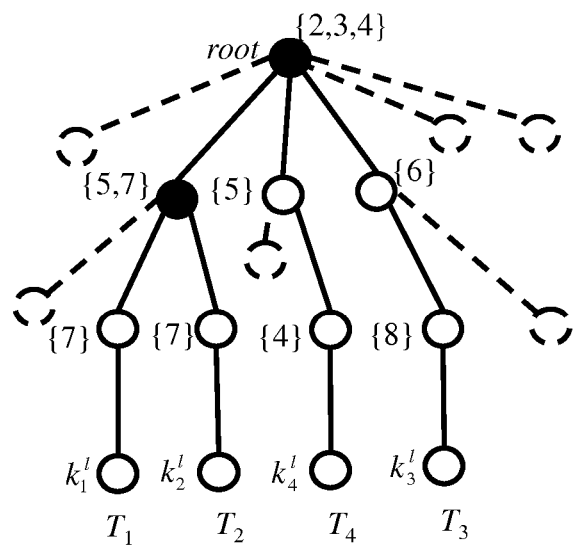

74

76

Computing $h(r_1,r_2,7)$; Comparing them with $v_2$; confirming that the 7 is key used by the tag at this level; Also computing $h(r_1,r_2,k^l_1)$ and comparing it with $v_3$, confirming the tag is valid.

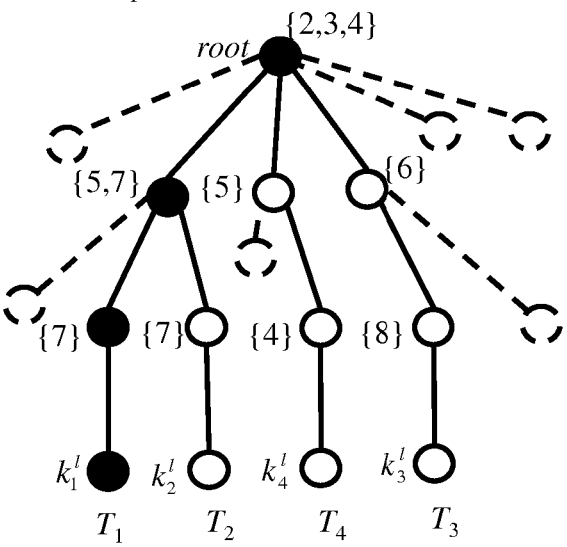

Fig. 9

Algorithm 3: TagLeave (Tag $T$, Key Tree $S$)

$k^p, k^l \leftarrow$ GetKey($T$);
($k^p[0],\ldots,k^p[d\text{-}1]$) $\leftarrow$ KeyDivision($k^p$);
Node $\leftarrow$ GetLeaf($T$);\\ Get the corresponding leaf node of T
for $i = d\text{-}1$ to 0
    if Node doesn't have brothers
        TempNode $\leftarrow$ Node;
    Node $\leftarrow$ FindParent(TempNode);
    Delete the $k_i$ from the Index Set $IS$ of Node;
    Delete TempNode;
    else Node $\leftarrow$ FindParent(Node);

Fig. 10

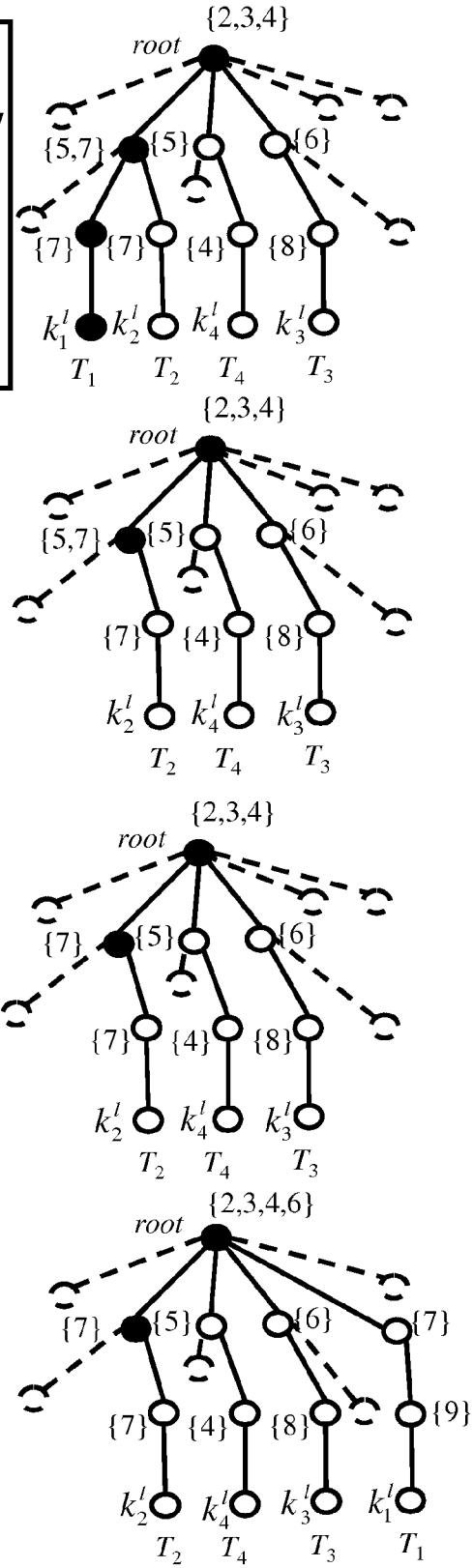

The reader R computes a new path key from the old path key $k^p_i = 257$ and leaf key $k^l_i$ by computing $h(r_1, r_2, k^p_i, k^l i)$. Similarly, R calculates the new leaf key as $h(r_1, r_2, k^p_i, k^l i)$. Assume the new $k^p_1 = 679$.

80

Locating the leaf node of Tag $T_1$; Removing the leaf node and deleting the old key $k^l i$;

82

According to the Algorithm 3 TagLeave, going to the parent node. Since here the node has some key (7 in the figure) is used by other tags, the algorithm terminates.

84

86

Executing the Algorithm 1 TagJoin, to add the new path for tag $T_1$.

Fig. 11

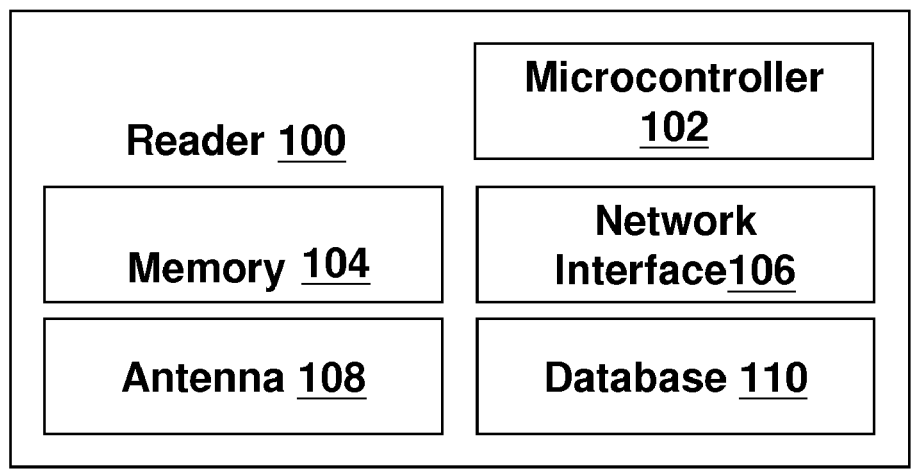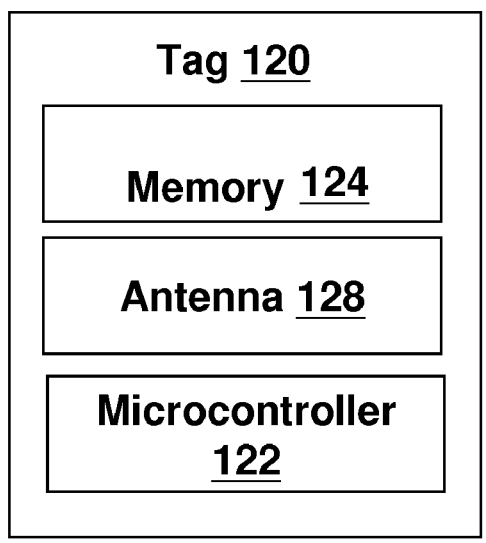
Fig. 12

RFID PRIVACY-PRESERVING AUTHENTICATION SYSTEM AND METHOD

CROSS-REFERENCE TO RELATED APPLICATION

This application claims benefit under 35 U.S.C. §119(e) of U.S. Provisional Application having Ser. No. 61/136,257 filed Aug. 22, 2008, which is hereby incorporated by reference herein in its entirety.

FIELD OF INVENTION

This invention relates to authentication systems, in particular a privacy-preserving authentication system.

BACKGROUND OF INVENTION

Many service providers need to authenticate a device before extending the service to that device. A good authentication system will also protect the privacy and identity of the device from malicious attacks. When the number of devices requesting the service is large, it is a challenge to scale up the authentication process yet providing reasonable response time. This is the challenge that is faced in many Radio-Frequency Identification (RFID) applications.

In RFID systems, RF tags emit their unique serial numbers to RF readers when they are being interrogated. Without privacy protection, however, any reader can identify a tag ID via the emitted serial number. Indeed, within the scanning range, a malicious reader can easily perform bogus authentication with detected tags to retrieve sensitive information. Currently, as most tags indicate the unique information of the items, a customer carrying those tags is subject to silent track from unauthorized readers. Sensitive personal information might be exposed. Clearly, a secure RFID system must meet two requirements. On the one hand, a valid reader must be able to identify the valid tags; on the other hand, misbehaving readers should not be able to retrieve private information from those tags.

In order to protect user privacy, Privacy-Preserving Authentication (PPA) is introduced into the interactive procedure between RFID readers and tags. To achieve PPA, an RFID tag performs a cryptography enabled challenging-response procedure with a reader. For example, we can let each tag share a distinct key with the reader. During authentication, the reader first probes a tag via a query message with a nonce. Instead of using the plaintext to directly answer the query, the tag encrypts the nonce and reply the cipher to the reader. The back-end database of the reader searches all keys that it holds, and finds a proper key to recover the authentication message (if it does find one), and thereby identifies the tag. (For simplicity, we will use the term "reader" to denote the reader device as well the back-end database in what follows) If the tag is invalid, it cannot provide a proper cipher related to a key owned by the reader. In this procedure, the tag does not expose its identity to any third party. Meanwhile, the key used for encrypting messages is only known by valid readers. A malicious reader cannot identify a user via probing the valid tag.

Being simple and secured, such a PPA based design suffers poor scalability. Upon receiving a cipher of nonce, the reader needs a prompt lookup to locate a key in the database. Clearly, the search complexity is O(N), where N is the number of all the possible tags, even only a small portion of them are in the reader's range. In today's large-scale RFID systems, N is often as large as hundreds of millions, and thousands of tags may respond to a reader simultaneously, demanding a fast key-search method as well as a carefully designed key-storage structure. Hence, balance-tree based schemes are proposed to accelerate the authentication procedure, in which the lookup complexity is O(log N).

The existing balance-tree based approaches are efficient, nevertheless, not secured due to the key-sharing feature of balance-trees. As the key storage infrastructure of balance-tree based approaches is static, each tag, more or less, shares some common portions of keys with other tags (we use normal tags to denote those tags which are not tampered with). Consequently, compromising one tag might reveal information of other tags. L. Lu et al. evaluate the damage caused by compromising attacks to balance tree-based approaches: In a RFID system containing $2^{20}$ tags, and employing binary tree as the key tree, an adversary, by compromising only 20 tags, has a probability of nearly 100% to be able to track normal tags.

To mitigate the impact of compromising attacks, L. Lu et al. propose a dynamic key-updating scheme, Strong and lightweight RFID Private Authentication protocol (SPA), for balance tree-base approaches. The key-updating of SPA reduces the number of keys shared among compromised and normal tags, and alleviate the damage caused by compromising attacks. SPA, however, does not completely eliminate the impact of compromising attacks. For instance, using SPA in a RFID system with $2^{20}$ tags, the probability of tracking normal tags is near to 60% after an adversary compromises 20 tags.

Another drawback for balance-tree based PPAs is the large space needed to store keys in each tag. Balance-tree based approaches require each tag to hold $O(\log_\delta Y)$ keys, and the reader to store $\delta \cdot N$ keys, where $\delta$ is a branch factor of the key tree. Obviously, due to the limited memory capacity of current RF tags, existing PPAs are difficult to be applied in current RFID systems.

SUMMARY OF INVENTION

In the light of the foregoing background, it is an object of the present invention to provide an alternate authentication method and system, called Anti-Compromising authenticaTION (ACTION) below. This alternate method can be applied to RFID system or any other systems that require authentication.

Accordingly, the present invention, in one aspect, is a method of authentication between a first device and at least one second device, which includes the steps of:
  i) sending a first random number from the first device to the second device; the second device including at least one key;
  ii) generating a second random number at the second device;
  iii) computing a plurality of cryptographic values at the second device using a cryptographic function;
  iv) sending the second random number and the plurality of cryptographic values from the second device to the first device, where the first device can have access to a key database that stores at least one key of at least one second device;
  v) identifying the validity of the second device at the first device from the second random number and the plurality of cryptographic values received from the second device.

Each cryptographic value is computed using the first random number, the second random number, and at least a portion of one of at least one key of the second device as inputs. Each cryptographic value can be computed independent of the others.

In another embodiment, the keys in the key database are stored using a sparse tree data structure arranged in multiple levels. The sparse tree has a root node at the top level and a plurality of leaf nodes at the lowest level. The root node is connected to the plurality of leaf nodes via non-leaf nodes at levels between the top level and the lowest level. The root node and the non-leaf nodes further store a set of index numbers. The leaf key is associated with the leaf node and the path key corresponded to the path that traverses the path tree from the top node to the leaf node. The identifying step further contains the steps of:

performing the following substeps starting from the root node and traversing to the non-leaf nodes until a leaf nodes is reached:
  (i) computing a path cryptographic value at the first device using the first random number, the second random number and one of at least one the index number stored in the node of the sparse tree;
  (ii) comparing the path cryptographic value to the cryptographic values received from the second device using the first random number, the second random number and a portion of the path key of the second device as inputs;
  (iii) if a match is found, moving to a node which the index number refers to; otherwise repeating steps i) and ii) using another index number until all index numbers have been tried;
  (iv) repeating steps i) to iii) using another cryptographic value received from the second device based on another part of the path key, until a leaf node is reached;
computing a second cryptographic value at the first device using the first random number, the second random number received from the second device and the leaf key associated to the leaf node, and
declaring the second device to be valid if the second cryptographic value is identical to a cryptographic value received from the second device using the first random number, the second random number and the leaf key of the second device.

In another exemplary embodiment of the present invention, the method further updates the path key and the leaf key of the tag if the tag is valid.

In another aspect of the current invention, a system of authentication contains at least one second device, a key database, and a first device. Each second device contains a path key and a leaf key. The first device which has access to a key database. The key database stores the path key and the leaf key in a sparse tree data structure. The sparse tree is arranged in multiple levels having a root node at the top level and a plurality of leaf nodes at the lowest level. The root node is connected to the plurality of leaf nodes via non-leaf nodes at levels between the top level and the lowest level. The root node and the non-leaf nodes further store a set of index numbers. The leaf key is key is associated with the leaf node and the path key corresponded to the path that traverses the sparse tree from the top node to the leaf node. During authentication, the first device generates a first random number and sends to the second device. The second device generates a second random number and computes a plurality of cryptographic values using a cryptographic function. Each cryptographic value computed is independent of the others. The second device sends the second random number and the computed cryptographic values to the reader, in which a validity of the tag is identified.

In a preferred embodiment, the keys in the key database are stored using a sparse tree data structure arranged in multiple levels. The sparse tree has a root node at the top level and a plurality of leaf nodes at the lowest level. The root node is connected to the plurality of leaf nodes via non-leaf nodes at levels between the top level and the lowest level. The root node and the non-leaf nodes further store a set of index numbers. The leaf key is associated with the leaf node and the path key corresponded to the path that traverses the path tree from the top node to the leaf node. The identifying step further contains the steps of:

i) performing the following substeps starting from the root node and traversing to the non-leaf nodes until a leaf nodes is reached:
  computing a path cryptographic value at the first device using the first random number, the second random number and one of at least one the index number stored in the node of the sparse tree;
  comparing the path cryptographic value to the cryptographic values received from the second device using the first random number, the second random number and a portion of the path key of the second device as inputs;
  if a match is found, moving to a node which the index number refers to; otherwise repeating steps i) and ii) using another index number until all index numbers have been tried;
  repeating steps i) to iii) using another cryptographic value received from the second device based on another part of the path key, until a leaf node is reached;
ii) computing a second cryptographic value at the first device using the first random number, the second random number received from the second device and the leaf key associated to the leaf node, and
iii) declaring the second device to be valid if the second cryptographic value is identical to a cryptographic value received from the second device using the first random number, the second random number and the leaf key of the second device.

The present invention effectively defends against compromising attacks. If an attacker can track a normal tag with probability larger than $\alpha$, it must tamper with more than $(N-1/\alpha)$ tags, while in previous balance-tree based approaches, by compromising O(log N) tags, an attacker can track a normal tag with the probability close to 1.

Another salient feature of this design is low storage requirements. For an overall system having N tags, ACTION only requires each tag to store two keys (for example 128 bits) and the reader to store 2N keys, achieving high storage efficiency for both readers and tags, making this design practical for today's RF tags. In contrast, existing tree-based approaches has to store at least O(log N) keys in each tag and $\delta \cdot N$, $\delta \geq 2$, keys in the backend application.

In ACTION, the diverse branching factors will enhance the security of RFID systems. This feature poses significant advantages, such as the higher efficiency and security. ACTION retains high search efficiency in the sense that the lookup complexity is still log N, as good as the best of previous designs.

Moreover, ACTION uses a common sparse tree as the key tree. The branching factor of each non-leaf node can be different. Therefore, without the knowledge about the exact shape of the key tree, any adversary cannot generate correct ciphers (authentication messages). The attacker thereby cannot force the valid reader to move deeper in the key tree for performing authentication processes, which means Deny-of-Service (DoS) attack can be effectively overcome if ACTION is used. As a result, ACTION does not need a root key to defend against DoS attacks compared to SPA, and gains higher storage efficiency.

BRIEF DESCRIPTION OF FIGURES

FIG. 4 is an exemplary algorithm of joining a tag into a sparse tree, according to an embodiment of the present invention.

FIG. 6 is a diagram showing the authentication process between a reader and a tag according to an embodiment of the present invention.

FIG. 7 is an exemplary algorithm of authenticating between a reader and a tag, according to an embodiment of the present invention.

FIG. 9 is a procedural flow chart of a reader identifying a tag after receiving a message from the tag, according to an embodiment of the present invention.

FIG. 10 is an algorithm of erasing a node in a sparse tree, according to an embodiment of the present invention.

FIG. 11 is a procedural flow chart of updating a tag with a new path key and new leaf key in a sparse tree, according to an embodiment of the present invention.

FIG. 12 is an exemplary system diagram showing one reader and one tag, according to one embodiment of an RFID application.

DETAILED DESCRIPTION OF THE PREFERRED EMBODIMENTS

As used herein and in the claims, "comprising" means including the following elements or steps but not excluding others. Moreover, "key" means security key that is used in computer cryptographic function.

Various embodiments of the present invention will now be described more fully with reference to the accompanying drawings. The invention may, however, be embodied in many different forms and should not be construed as limited to the embodiments set forth herein; rather, the embodiments are provided so that this disclosure will be thorough and complete, and will fully convey the scope of the invention to those skilled in the art.

The presented invention, termed as ACTION, is for preserving user privacy in authentication. In an exemplary embodiment, this invention provides an authentication method for an RFID system. In the following paragraphs, a detailed explanation of how ACTION can be designed and implemented for an RFID application is disclosed in full. It should not be construed, however, that the present invention can only be applied to RFID applications.

ACTION mainly has four components: system initialization, tag identification, key-updating, and system maintenance.

In the first component, a sparse tree is employed to organize keys for tags. In one embodiment where the key length is 128 bit long, the sparse tree can support $2^{128}$ tags. Two random keys (128 bits) are generated, denoted as path key $k_p$ and leaf key $k_l$, to a tag and a corresponding path in the sparse tree according to $k_p$ value. After key initialization, each tag is associated to a leaf node in the tree. The leaf node thereby represents the key $k_l$ assigned to the tag, and the path from the root to the leaf node indicates the key $k_p$. Since the two keys are randomly generated, keys among different tags are independent.

For simplicity, assuming that there are N tags $T_i$, $1 \leq i \leq N$, and a reader R in the RFID system, according to an embodiment of the present invention. Let S denote the sparse tree used in ACTION. Let δ denote the branching factor of the key tree and d denote the depth of the tree. Each tag in the system is associated with a leaf node in S. Each tag $T_i$ shares two secret keys with the reader R. The secret keys shared by tag $T_i$ and reader R are denoted as $k_i^p$ for path key 22 and leaf key $k_i^l$ for leaf key 24 in FIG. 1.

Figure 1:
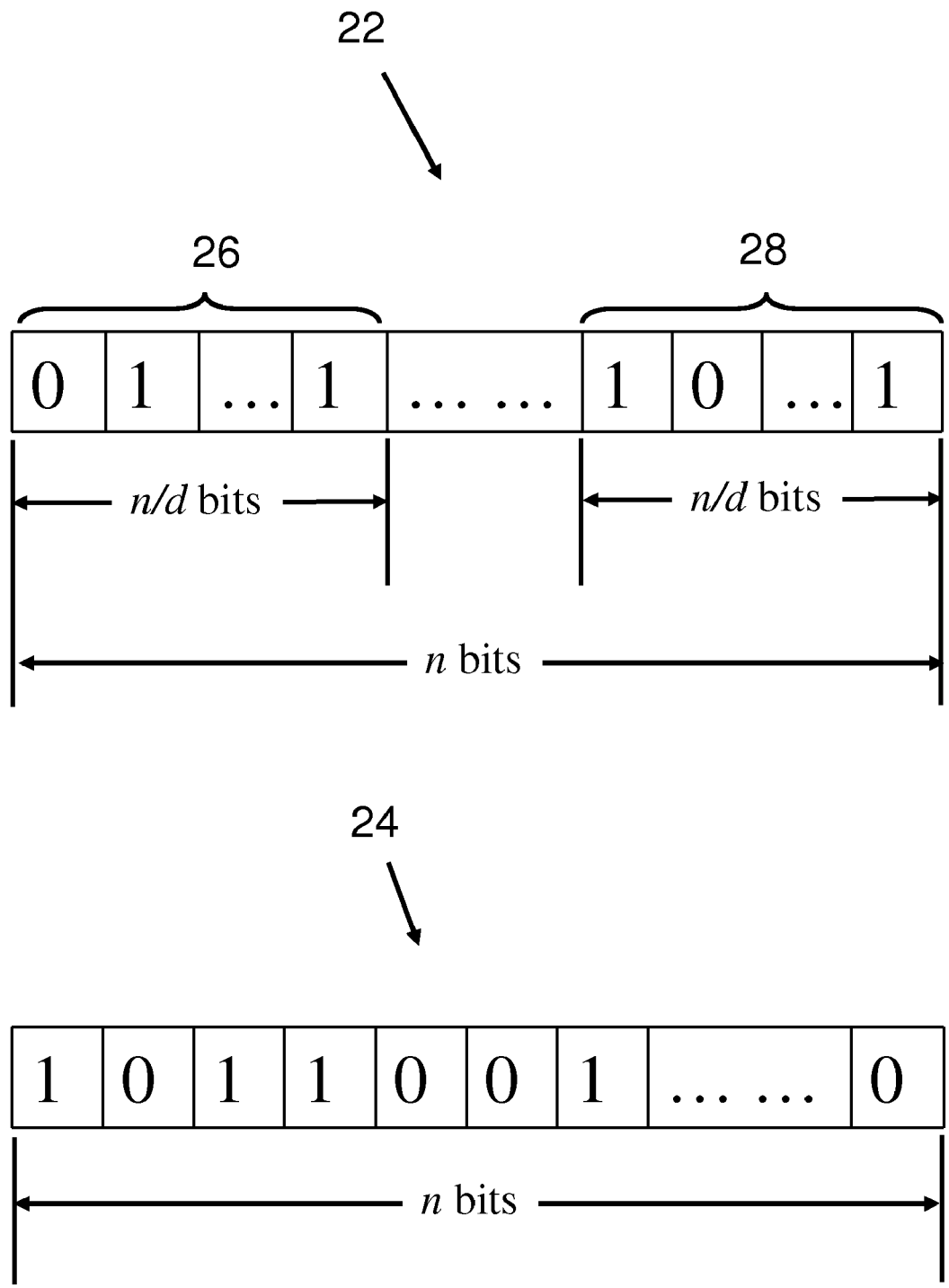
FIG. 1 shows a path key and a leaf key according to an embodiment of the present invention.

Let n be the length of $k_i^p$ 22 and $k_i^l$ 24, i.e. $|k_i^p|=|k_i^l|=n$. As shown in FIG. 1, $k_i^p$ 22 is split into d parts; i.e. $k_i^p=k_i^p[0]\|k_i^p[1]\|\ldots\|k_i^p[d-1]$, and the length of each $k_i^p[m]$ is n/d, m=0...d−1. As an example, the first part of $k_i^p$ 22, i.e. $k_i^p[0]$ is labeled as 26 and the last part $k_i^p[d-1]$ is labeled as 28 in the Figure. The branching factor δ of each non-leaf node in S is set as $2^{n/d}$, namely d×log δ=n. For example, if the key length is 128 bits and d=32, the branching factor of S is $\delta=2^{128/32}=2^4=16$. In other words, each non-leaf node is able to accommodate 16 child positions in S. If the c-th child node exists in a child position of non-leaf node j, c is set as the index number of this child and record c in j. Note that a non-leaf node only stores the index numbers for existing children.

Figure 2:
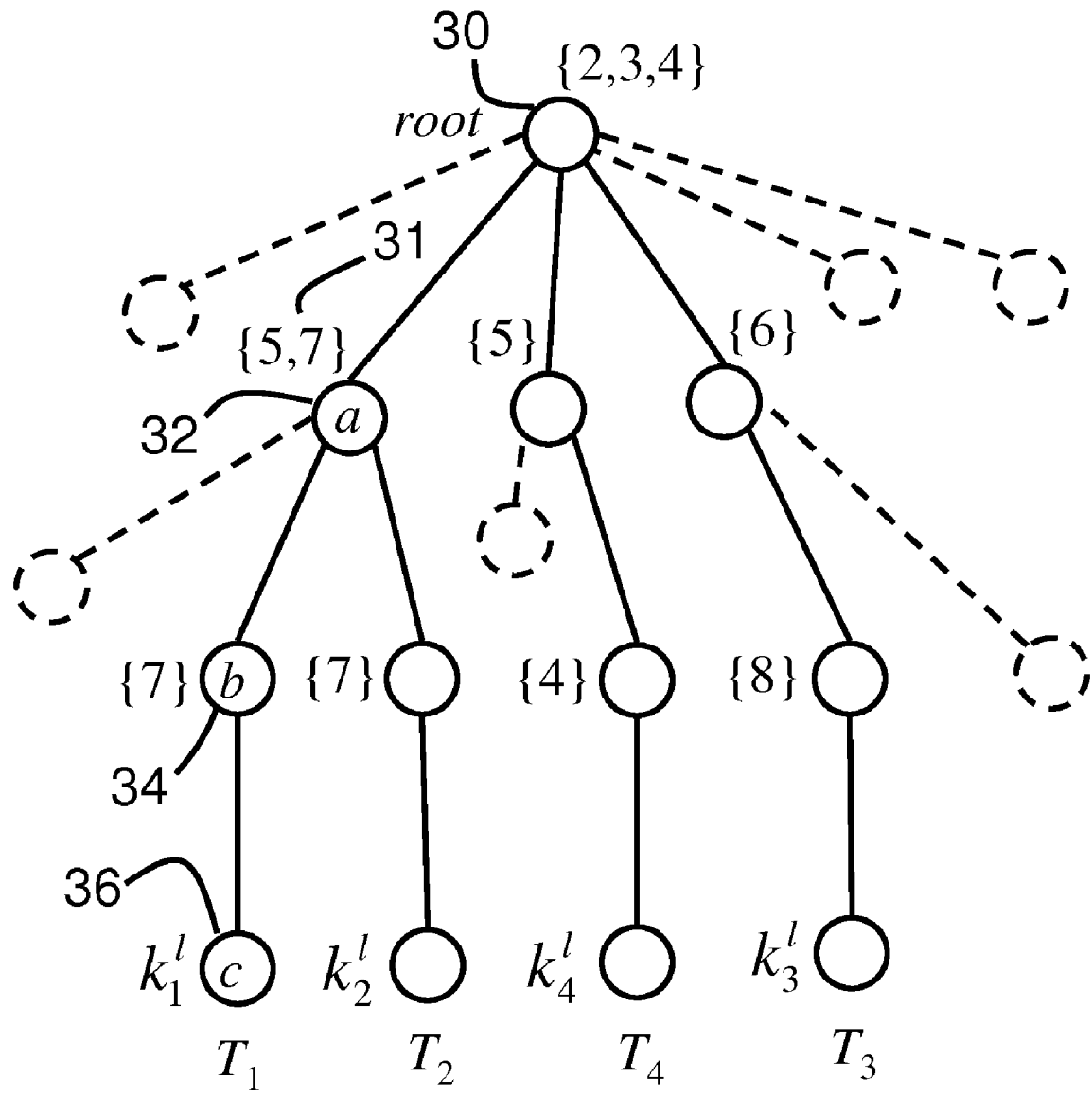
FIG. 2 is a sparse tree used to organize tags, according to an embodiment of the present invention.

For simplicity, let $IS_j$ denote the set of j's index numbers, and $IN_j$ denote the element number of $IS_j$, i.e. $IN_j=|IS_j|$. An example is shown in FIG. 2, in which the branching factor $\delta=2^4$. Each non-leaf node has 16 child positions. For a non-leaf node a 32, as shown in FIG. 2, the reader will maintain its index number set 31 as $IS_a=\{5, 7\}$, and $IN_a=2$.

Figure 3:
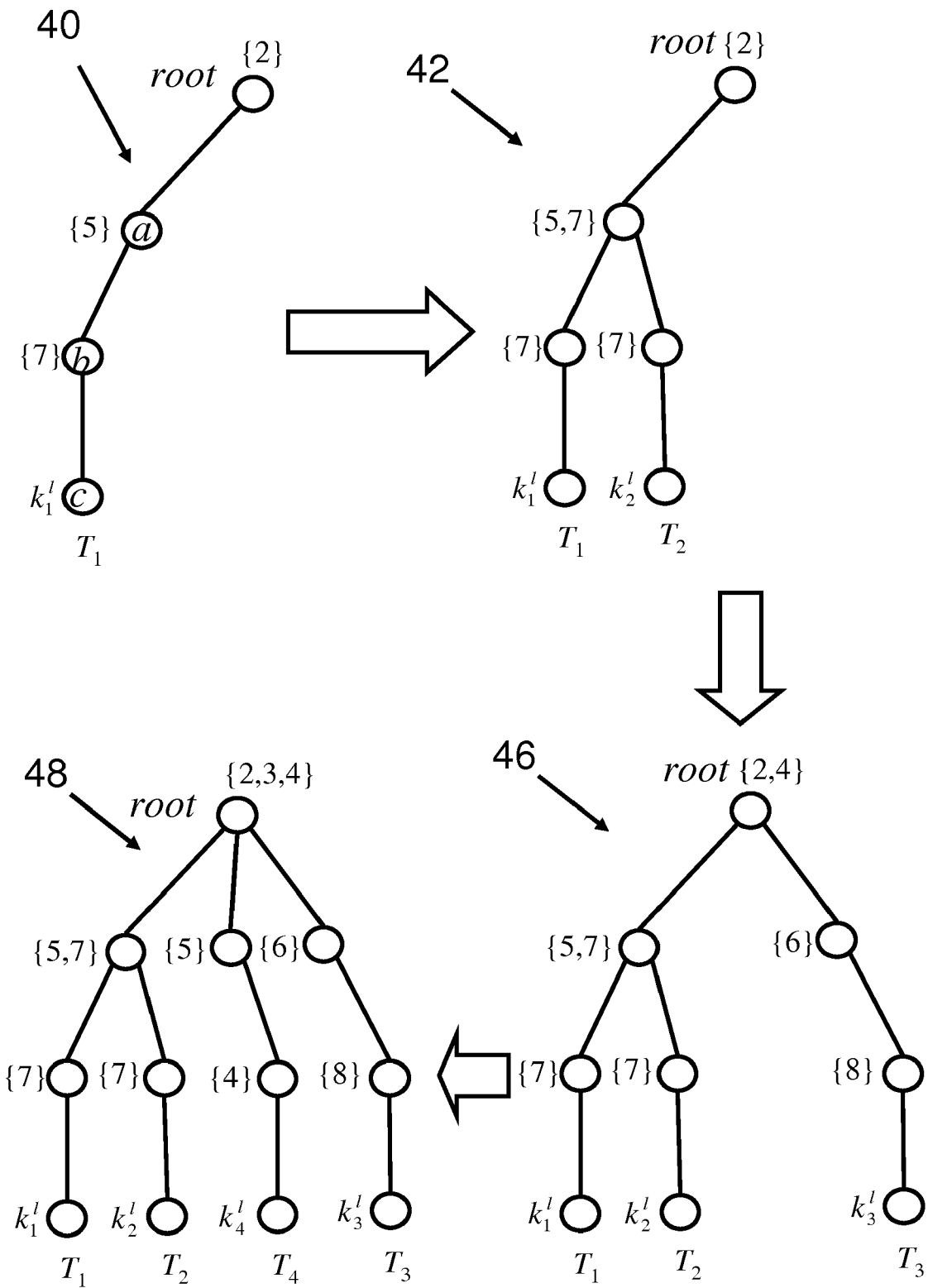
FIG. 3 is a procedural flow chart of joining tags to a sparse tree, according to an embodiment of the present invention.

Referring to FIGS. 2 to 4, a flow chart and an algorithm for organizing tags in a sparse tree according to an embodiment of the present invention is illustrated. Initially, the tree is empty. The reader R generates two keys $k_i^p$ and $k_i^l$ uniformly at random for every tag $T_i$. Meanwhile, the reader divides each $k_i^p$ into d parts, $k_i^p[0]\|k_i^p[1]\|\ldots\|k_i^p[d-1]$, where d is the depth of the key tree S. The reader distributes $k_i^p$ and $k_i^l$ to tag $T_i$ and organize $k_i^p$ in S as follows. From the root, the reader generates a non-leaf node at each level m according to the corresponding $k_i^p[m]$. That is, after the reader generates a node a at the level m−1 according to the $k_i^p[m-1]$, it will generate the $k_i^p[m]$-th child of node a 32, and set an index number of a as $k_i^p[m]$. In one exemplary embodiment as shown in FIG. 2, the branching factor δ of S is 16, and there are 4 tags in the system, denoted as $T_1, T_2, T_3$, and $T_4$. Assume that the length of path key is 12 bits. Each path key is divided into 3 parts, and the length of each part is 4 bits (because δ=16, the length of each part of a key should be $\log_2 16=4$ bits). The reader generates four path keys as 257, 277, 468, and 354 for tags $T_1$-$T_4$, respectively. The reader also generates four leaf keys, as $k_1^l, k_2^l, k_3^l$, and $k_4^l$ for $T_1$-$T_4$, respectively. For $T_1$, $k_1^l=257$ (0010|0101|0111), thus, $k_1^p[0]=2, k_1^p[1]=5$, and $k_1^p[2]=7$. The reader first generates a child at the root 30, and sets an index number as 2 ($k_1^p[0]=2$). Here the index number 2 means the root has a child marked as node a 32 in its second position, as illustrated in FIG. 2. Then the reader generates a child b 34 of node a 32, and sets an index number of a as 5 ($k_1^P[1]=5$). Finally, the reader generates a child c of node b, which is a leaf node c 36, and sets an index number of b as 7 ($k_1^P[2]=7$). Indeed, the key organization can be analogous to generate a path in tree S. In the above example, the path of $T_1$ is root→a→b→c as shown by step 40 in FIG. 3. After the same procedure is applied on tags $T_2$, $T_3$, and $T_4$, as shown by steps 42, 46 and 48 in FIG. 3, a sparse tree is obtained as illustrated in FIG. 2.

Figure 5:
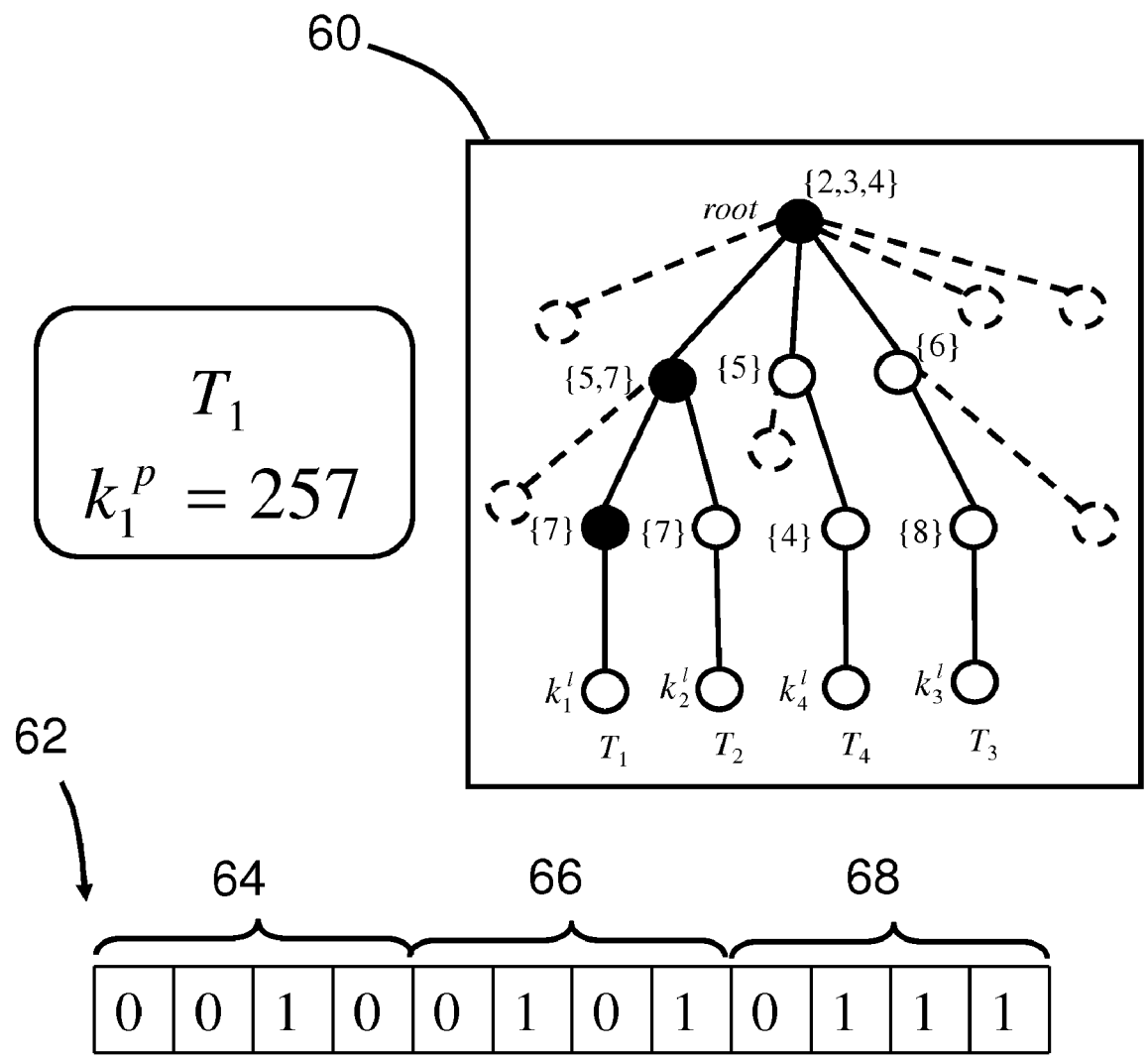
FIG. 5 is a diagram showing mapping of the path key to a tag in a sparse tree, according to an embodiment of the present invention.

After key initialization, each tag is associated to a leaf node in the tree. The leaf node thereby represents the key $k_i^l$ assigned to the tag, and the path from the root to the leaf node indicates the key $k_i^P$. An example is shown in FIG. 5 to illustrate mapping relationship between the path in the key tree S and the key $k_i^P$ in the tag. For the key path $k_1^P$ 62 of $T_1$, $k_1^P[0]$ 64 has a binary representation of 2, $k_1^P[1]$ 66 has a binary representation of 5 and $k_1^P[2]$ 68 has a binary representation of 7. In the sparse tree S 60, at the root level, $k_1^P[0]$ is determined to be 2 so the child node of index number 2 is checked next. $k_1^P[1]$ and $k_1^P[2]$ are determined using the same logic and the path to tag $T_1$ is selected as shown in FIG. 5.

Figure 6:
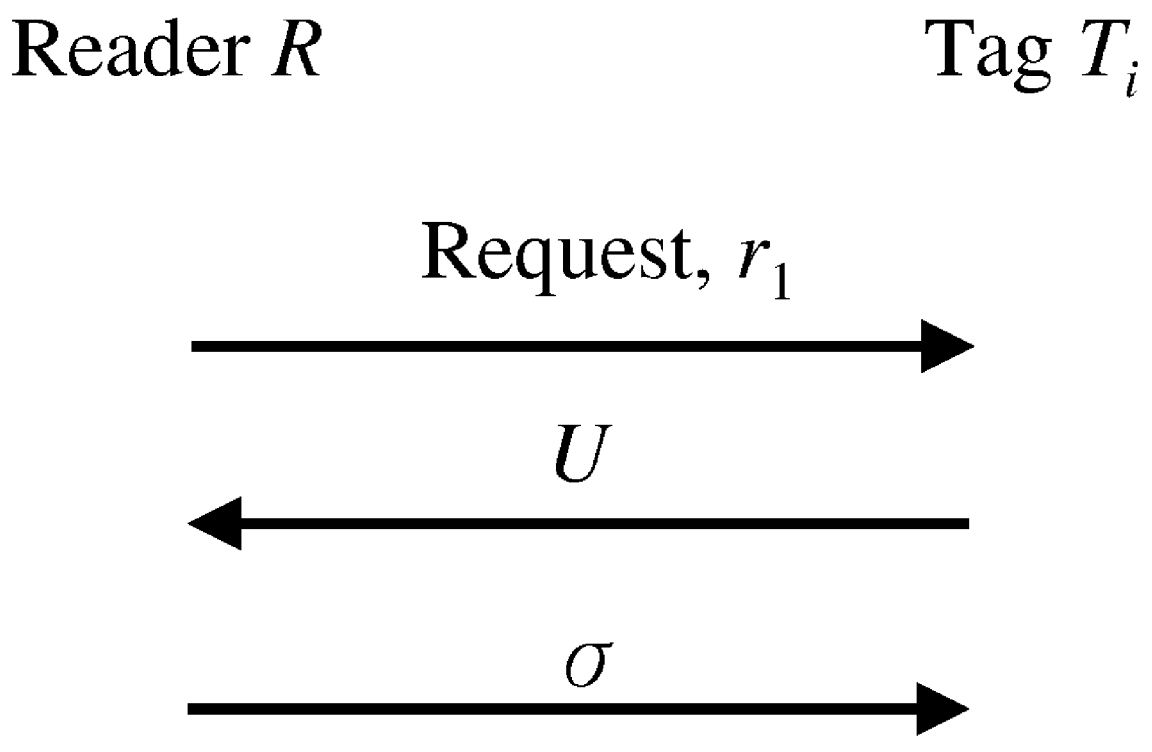

In one embodiment, ACTION employs cryptographic functions to generate authentication messages and update keys. In one embodiment, the cryptographic function is hash function. Let h denote a cryptographic hash function: $h: \{0,1\} \rightarrow \{0,1\}^n$, where n denotes the length of hash value. Let N be the number of all tags in the system. The basic authentication procedure between the reader and a tag $T_i$ ($1 \leq i \leq N$) includes three phases, as illustrated in FIG. 6. In the first phase, the reader R sends a "Request" with a random number $r_1$ (a nonce) to tag $T_i$. In the second phase, upon receiving "Request", tag $T_i$ generates a random number $r_2$ (a nonce) and calculates a series of hash values, $h(r_1, r_2, k_i^P[0])$, $h(r_1, r_2, k_i^P[1])$, ..., $h(r_1, r_2, k_i^P[d-1])$, $h(r_1, r_2, k_i^l)$, where $h(r_1, r_2, k)$ denotes the output of the hash function on three inputs: a key k and two random numbers $r_1$ and $r_2$. $T_i$ replies to R with a message $U=(r_2, h(r_1, r_2, k_i^P[0]), h(r_1, r_2, k_i^P[1]), \ldots, h(r_1, r_2, k_i^P[d-1]), h(r_1, r_2, k_i^l))$. For simplicity, we denote the elements in U as $u, v_o, v_1, \ldots, v_{d-1}, v_d$ where $u=r_2$ and $v_j=h(r_1, r_2, k_i^j)$, $j=0 \ldots d-1$, $v_d=h(r_1, r_2, k_i^l)$. In the third phase, R identifies $T_i$ using the key tree S and the received U.

In this embodiment, the hash values computed by the tag $T_i$, i.e. $h(r_1, r_2, k_i^P[0])$, $h(r_1, r_2, k_i^P[1])$, ..., $h(r_1, r_2, k_i^P[d-1])$, $h(r_1, r_2, k_i^l)$, are independent and do not rely on each other. That means all hash values can be generated in parallel. Compared to a method which the hash values are generated serially, the time used in computing hash values of the present invention is minimized. Also, as the process of computing hash value may induce error in the result, computing the hash values in parallel also minimizes the damage when an error is induced by the cryptographic hash function, since an error induced when computing one hash value will not diffuse to other hash values. Whereas in a serial hash value computation method, an error will propagate to all later computed hash values.

Reader R invokes a recursive algorithm to probe a path from the root to a leaf in S to identify $T_i$. In one embodiment, Algorithm 2 as shown in FIG. 7 is used. Assume R reaches a non-leaf node a at level m−1. For all index numbers stored in a, R computes a hash value with inputs as $r_1$, $r_2$, as well as the index numbers, and then compares the hash value with the element $v_m$ in the received U. If there is match, the path of $T_i$ should be extended to the child related to the index number. Note that here the child node is on the path assigned to $T_i$. Repeating such a procedure until arriving at a leaf node, R recognizes the tag $T_i$.

Figure 8:
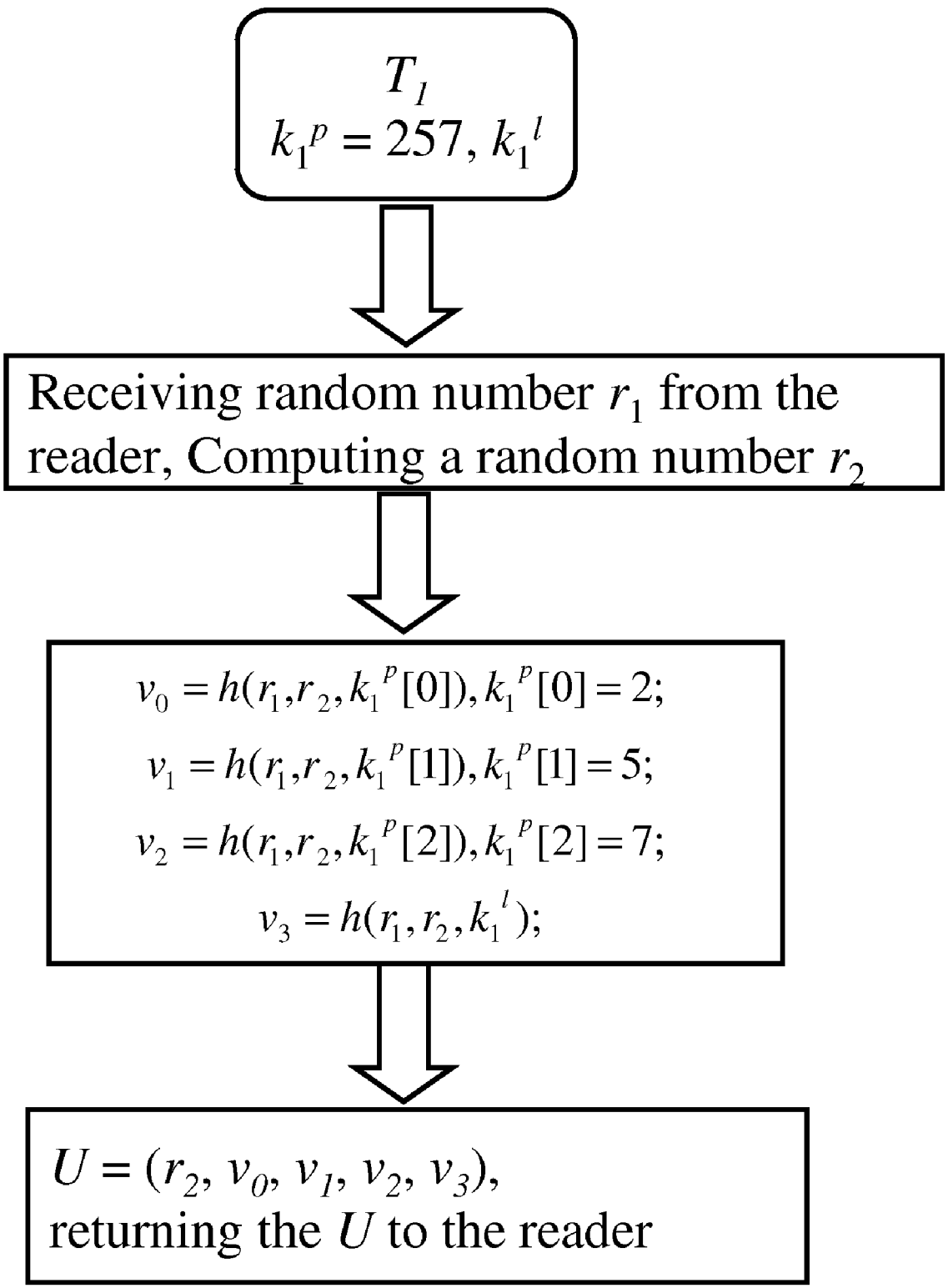
FIG. 8 shows an example of computing a series of hash values during authentication, according to an embodiment of the present invention.

For the example in FIG. 8, on receiving a "Request" message with a random $r_1$, $T_1$ generates a random number $r_2$, and computes a series of hash values $h(r_1, r_2, 2)$, $h(r_1, r_2, 5)$, $h(r_1, r_2, 7)$, and $h(r_1, r_2, k_i^l)$, then replies R with the message $U=(u, v_o, v_1, v_2)=(r_2, h(r_1, r_2, 2), h(r_1, r_2, 5), h(r_1, r_2, 7), h(r_1, r_2, k_i^l))$.

FIG. 9 shows a process of a reader R reading a message U sent from the tag $T_1$ in one embodiment. The reader R first receives the message U in step 70. On receiving U, R first computes all $h(r_1, r_2, x)$ to compare with $v_1$ as shown in step 72. In the example shown here, x=2, 5 and 7, which are all the index numbers stored in the root. Clearly, R locates 2 as a match number and thereby moves to node a Then in steps 74 and 76, R locates 5 and 7 in the nodes b and node c, respectively. R terminates its path probing when it reaches the leaf node c, thereby identify $T_1$.

After successfully identifying $T_i$, R and $T_i$ automatically update the key stored in $T_i$ and coordinate the change in the tree S as follows.

The reader R makes use of a cryptographic hash function h to generate new keys. Let $k_i^P$ and $k_i^l$ be the current path key and leaf key used by $T_i$. The reader R computes a new path key $\overline{k_i^P}$ from the old path key $k_i^P$ and leaf key $k_i^l$ by computing $\overline{k_i^P}=h(r_1, r_2, k_i^P, k_i^l)$. Similarly, R calculates the new leaf key as $\overline{k_i^l}=h(r_1, r_2, k_i^l)$. The index numbers of non-leaf nodes needs to be modified with care according to the new key $\overline{k_i^P}$. Otherwise, some tag identifications can be interrupted, since the index number stored in non-leaf nodes might be shared among multiple tags In one exemplary embodiment, two algorithms are designed for key-updating: 1) TagJoin, as shown in FIG. 4; and 2) TagLeave, shown in FIG. 10. The basic idea is that one first uses the TagLeave to remove the path corresponding to old path key $k_i^P$ of tag $T_i$, and then generate a new path corresponding to the key $\overline{k_i^P}$ in S. It is possible that a non-leaf node in the path has multiple branches so that some keys are used by other tags, for example, the node a in FIG. 2. In this case, the TagLeave algorithm terminates.

In FIG. 11, an example of $T_1$'s key-updating process is shown. In step 80, the reader R computes a new path key $k_i^P=679$ from the old path key $k_i^P=257$ and leaf key $k_i^l$ by computing $h(r_1, r_2, k_i^P, k_i^l)$. Similarly, R calculates the new leaf key as $h(r_1, r_2, k_i^l)$.

After deleting the old key in step 82 and 84, R re-generates a new path for tag $T_i$ according to the new key $\overline{k_i^P}$ using the TagJoin algorithm. A potential problem of new path generation is that the path has already existed in S, which means the key $\overline{k_i^P}$ has been generated before in the systems. The probability of this situation happens is quite small. First, the sparse tree is a virtual tree according to the initialization algorithm. Before the tag deployment, the tree is empty. When a path key is generated by a hash function, a route from a certain leaf to the root is emerged accordingly in the sparse tree. Therefore, a route in the sparse tree corresponds to a hash value. This correspondence leads to twofold facts: 1) the capability of sparse tree is as large as the size of the hash value space. In one embodiment of the present invention, a path key is a hash value with a length of 128 bits, which indicates the sparse tree can hold $2^{128}$ routes in maximum, that is, the sparse tree can hold $2^{128}$ tags correspondingly. In any practice RFID system, however, the number of tags is much less than $2^{128}$. The probability of the tree becomes dense is negligible. 2) A route in the sparse tree corresponds to a hash value, Therefore, if two tags have a same route in the sparse tree, it means a hash collision occurs. According to the collision-resistance property of hash functions, the probability of collision happening is also negligible. For example, in an RFID system contains $2^{20}$ tags, and the length of path key is 128 bits, the ratio of occupied routes in the sparse tree is $2^{-108}$ ($2^{20}/2^{128}$) and the path key is generated uniformly at random. Thus, the probability of generating an existing route is $2^{-108}$. Combining the above analyses, it is safe to claim that the probability of two tags having a similar route is negligible.

If such a collision does happen, another new key can be generated. In one embodiment, R first generates a new key $\overline{k_i^{p2}} = h(r_1, r_2, \overline{k_i^p}, k_i^l)$, and then executes the TagJoin algorithm again to create a new path in S. R repeats such a procedure until a new path is successfully generated. R counts the number of TagJoin runs, denoted as s (due to the negligible probability of collisions, s usually equals to 1), and sends a synchronization message $\sigma = (s, h(r_1, r_2, \overline{k_i^{ps}}), h(r_1, r_2, k_i^l))$ to tag $T_i$, as shown in FIG. 6. Here $\overline{k_i^{ps}}$ is computed from iterative equations by:

$$\begin{cases} \overline{k_i^{p^1}} = k_i^p \\ \overline{k_i^{p^s}} = h(r_1, r_2, \overline{k_i^{p^{s-1}}}, k_i^l) \end{cases} \quad (1)$$

Having $\sigma$, $T_i$ first computes using $\overline{k_i^{ps}}$ and s with equation (1), then computes $\overline{k_i^l} = h(r_1, r_2, k_i^l)$. Thus $T_i$ gets $\sigma' = (s, h(r_1, r_2, \overline{k_i^{ps}}), h(r_1, r_2, \overline{k_i^l}))$. After computing $\sigma$ and $\sigma'$, $T_i$ verifies whether or not $\sigma = \sigma'$. If yes, $T_i$ updates its keys as $\overline{k_i^{ps}}$ and $\overline{k_i^l}$. Otherwise $T_i$ returns an error to reader. By doing that, $T_i$ can coordinate its key with the one generated by the reader.

Since the two keys are randomly generated, keys among different tags are independent. In the second component the reader performs a logarithmic search to identify a tag. In the third component, ACTION performs a key-updating procedure, in which ACTION employs a cryptographic hash function such as MD5, SHA-1, to update the old key in a tag. Note that the new key is still random and independent to the keys used by other tags. ACTION also reduces the maintenance overhead in high dynamic systems where tags join or leave frequently by using the fourth component.

If a new tag $T_i$ joins the system, R needs to find a new path in the key tree. In one embodiment, R invokes the TagJoin algorithm as shown in Algorithm 1. In a further embodiment, R generates a new path key $k_i^p$ and leaf key $k_i^l$ independent with other keys, then splits $k_i^p$ into d parts, $k_i^p[0]$, $k_i^p[1]$, ..., $k_i^p[d-1]$. Starting at the root, if R arrives at a non-leaf node j at level m, R adds $k_i^p[m]$ into j's index number set $IS_j$, and walks to the $k_i^p[m]$-th child of j (if this child does not exist, R creates it). When a leaf node is reached, R associates $T_i$ to the leaf node, and sets the key of the leaf node as $k_i^l$. A new path is generated for $T_i$. An example is shown in the step 86 of FIG. 11.

To withdraw a tag $T_i$, R should erase the path from the root to $T_i$'s associated leaf node. In one embodiment, the TagLeave algorithm is used. In this algorithm, R first deletes the leaf key $k_i^l$ of $T_i$. Starting from the associated leaf node of $T_i$, if R reaches a node e at level m, R first finds e's parent j, and then deletes $k_i^p[m]$ from the index set $IS_j$. After arriving at node f, R deletes e. R repeats this procedure until a non-leaf node in the path has multiple branches, for example, the node a in FIG. 2. Thus, R withdraws $T_1$. An example is shown in the steps 82 and 84 of FIG. 11.

The system block diagram shown in FIG. 12 depicts one exemplary embodiment of a RFID reader and tag assembly in which the present invention may be implemented. The reader 100 contains various hardware components such as the reader microcontroller 102, reader memory 104, network interface 106, reader antenna 108 and a database storage 110. The reader microcontroller 102 is connected to each of these components and serves as a central controlling unit. It will perform tasks such as generating random keys, calculating hash values, etc, as mentioned previously. The reader 100 may further communicate with external devices such as back-end computer servers or data stores that are not shown in this figure via the network interface 106. Examples of the network interface 106 include Wi-Fi adapter, USB port, ethernet port, etc.

Typically, an RIFD tag 120 contains an antenna 128 and memory 124. In the invention that is disclosed here, the tag 120 also comprises a microcontroller 122 that performs tasks such as hash function evaluation. In operation, the reader 100 sends out radio frequency (RF) electromagnetic wave through its antenna 108. When the tag 120 is in the vicinity of the reader 100, its antenna 124 will pick up the electromagnetic wave and provide electric power to the tag 120. The reader 100 can then send commands for the tag 120 to execute. This may include the authentication procedure that the present invention discloses.

Although FIG. 12 only shows one reader and one tag, there may be more than one reader and a plurality of tags in an RFID application. Furthermore, the database 110 in the reader 100 may hold the entire sparse tree that stores the path keys and the leaf keys. Alternatively, the sparse tree may be stored in an external data server and the reader 100 makes use of the network interface 106 to accesses the sparse tree via an external data network like the local area network or wide area network.

The exemplary embodiments of the present invention are thus fully described. Although the description referred to particular embodiments, it will be clear to one skilled in the art that the present invention may be practiced with variation of these specific details. Hence this invention should not be construed as limited to the embodiments set forth herein.

For example, in the embodiments above, the path key $k_p$ is divided into equal parts with a length of n/d bits. It follows that the branching factor $\delta$ is the same for all levels of non-leaf nodes. It is clear to one skilled in the art that the path key does not necessarily be divided into equal parts. For example, $k_1^p[0]$ can be of 6 bits long, and $k_1^p[1]$ can be of 3 bits long. That means the branching factor can vary for each level of non-leaf nodes.

The detail description above teaches that each tag stores two keys, the length of each is 128 bits. However, one skilled in the art should realize it is possible to use keys with other length, for example, 256 bits, 64 bits, etc. The length of the key chosen may depends on the storage limitation and/or computing power of the tag, for example.

In the exemplary embodiments described above, hash functions are used to generate authentication messages and update keys. It is clear to one skilled in the art that other kinds of cryptographic functions or mathematical algorithms such as members of MD family, SHA-1, low cost RFID hash functions constructed by non-linear feedback shift registers, and Whirlpool, etc., can also be used to fulfill the purpose.

Although the invention is directed to authentication systems using RFID, it can also be used in other authentication systems that involve a service provider and a plurality of devices that subscribe to its service. The invention disclosed here is therefore not restricted to only RFID applications.

What is claimed is:

1. A method of authentication between a first device and at least one second device, comprising the steps of:
   a) sending a first random number from said first device to said second device; said second device comprising at least one key;
   b) generating a second random number at said second device;
   c) computing a plurality of cryptographic values at said second device using a cryptographic function; each of said plurality of cryptographic values computed using said first random number, said second random number, and at least a portion of one of said at least one key of said second device as inputs;
   d) sending said second random number and said plurality of cryptographic values from said second device to said first device; said first device having access to a key database comprising said at least one key of said at least one second device; and
   e) identifying the validity of said second device at said first device from said second random number and said plurality of cryptographic values received from said second device;
   wherein said at least one key in said second device comprises a path key and a leaf key, said path key split into a plurality of parts, said plurality of cryptographic values computed independent of the others; said plurality of cryptographic values further comprising:
   i) a plurality of path cryptographic values computed using said first random number, said second random number and one of said plurality of parts of said path key of said second device as inputs; and
   ii) a leaf cryptographic value computed using said first random number, said second random number and said leaf key of said second device as inputs;
   wherein said at least one key in said key database is stored using a sparse tree data structure arranged in multiple levels having a root node at a top level and a plurality of leaf nodes at the lowest level; said root node connected to said plurality of leaf nodes via non-leaf nodes at levels between said top level and said lowest level; said root node and said non-leaf nodes further storing a set of at least one index number; said leaf key associated with said leaf node and said path key corresponding to a path that traverses said sparse tree from said top node to said leaf node; and said identifying step further comprising the steps of:
   (1) performing the following substeps starting from said root node and traversing to said non-leaf nodes until a leaf nodes is reached:
      (a) computing a non-leaf cryptographic value at said first device using said first random number, said second random number and a target index number selected from said set of at least one index number stored in said node of said sparse tree;
      (b) comparing said non-leaf cryptographic value to said plurality of path cryptographic values received from said second device;
      (c) if a match is found, moving to a node which said target index number refers to; otherwise repeating steps (a) and (b) using another index number from said set of at least one index number as target index number until all index numbers from said set of at least one index number have been tried; and
      (d) repeating steps (a) to (c) using another path cryptographic value from said plurality of path cryptographic values based on another part of said plurality of parts of said path key, until one of said plurality of leaf nodes is reached;
   (2) computing a second cryptographic value at said first device using said first random number, said second random number received from said second device and said leaf key associated to said leaf node, and
   (3) declaring said second device is valid if said second cryptographic value is identical to said leaf cryptographic value received from said second device using said first random number, said second random number and said leaf key of said second device.

2. The method according to claim 1, further comprises the step of updating said path key and said leaf key of said second device if said second device is valid.

3. The method according to claim 2, wherein said updating step further comprising the steps of:
   a) generating at least one new path node and a new leaf node at said sparse tree that is free from collision with corresponding a new path key and a new leaf key at said first device; said generating step further comprising the substeps of:
   i) computing said new path key $\overline{k_i^{ps}}$ by computing a cryptographic value $h(r_1, r_2, k_i^l)$ using said first random number $r_1$, said second random number $r_2$, said path key $k_i^p$ and said leaf key $k_i^l$ of said second device as inputs;
   ii) computing said new leaf key by computing a cryptographic value $h(r_1, r_2, k_i^l)$ using said first random number, said second random number and said leaf key as inputs; and
   iii) if collision occurs, incrementing the collision counter s by one and repeating steps i) and ii) using said new path key $\overline{k_i^{ps}}$ as path key $k_i^p$ until no collision occurs;
   b) removing said leaf node associated to said second device in said sparse tree;
   c) adding said at least one new path node and said new leaf node in said sparse tree according to said new path key, with said new leaf key associated to said new leaf node;
   d) sending a first synchronization message $\sigma=(s, h(r_1, r_2, \overline{k_i^{ps}}), h(r_1, r_2, \overline{k_i^l}))$ from said first device to said second device, where
   s is the value of said collision counter;
   $h(r_1, r_2, \overline{k_i^{ps}})$ is a new path cryptographic value using said first random number, said second random number and said new path key as inputs; and
   $h(r_1, r_2, \overline{k_i^l})$ is a new leaf cryptographic value using said first random number, said second random number and said new leaf key as inputs;
   e) creating said new path key at said second device by recursively computing said path cryptographic value according to the following equations:

$$\begin{cases} \overline{k_i^{p^1}} = k_i^p \\ \overline{k_i^{p^s}} = h(r_1, r_2, \overline{k_i^{p^{s-1}}}, k_i^l) \end{cases}$$

f) assembling a second synchronization message $\sigma'=(s, h(r_1, r_2, \overline{k_i^{ps}}), h(r_1, r_2, \overline{k_i^l}))$ where $\overline{k_i^l}=h(r_1, r_2, k_i^l)$;
   g) updating said path key and said leaf key at said second device if $\sigma$ is identical to $\sigma'$; and
   h) returning error if $\sigma$ is not the same as $\sigma'$.

4. The method of claim 1, wherein said first device is an RFID reader and said second device is an RFID tag.

5. The method according to claim 1, wherein said path key and said leaf key are randomly generated, such that said path key and said leaf key of one second device are independent to that of another second device.

6. The method according to claim 1, wherein said plurality of parts of said path key is not of a same length.

* * * * *